United States Patent [19]

Jackson

[11] Patent Number: 5,151,307
[45] Date of Patent: * Sep. 29, 1992

[54] COLOR MATCH MOLDING AND WEATHERSTRIP

[75] Inventor: Norman C. Jackson, Livonia, Mich.

[73] Assignee: The Standard Products Company, Cleveland, Ohio

[*] Notice: The portion of the term of this patent subsequent to Dec. 4, 2007 has been disclaimed.

[21] Appl. No.: 570,008

[22] Filed: Aug. 20, 1990

Related U.S. Application Data

[63] Continuation of Ser. No. 246,511, Sep. 19, 1988, Pat. No. 4,975,306.

[51] Int. Cl.⁵ ............................................. B60R 13/04
[52] U.S. Cl. ........................................ 428/31; 49/490; 49/506; 156/244.11; 428/90; 428/122; 428/358
[58] Field of Search ............... 428/31, 90, 122, 358; 49/490, 506, 491; 156/244.11; 293/128; 296/93

[56] References Cited

U.S. PATENT DOCUMENTS

| | | | |
|---|---|---|---|
| 3,310,928 | 3/1967 | Weimar | 428/122 X |
| 4,130,535 | 12/1978 | Coran et al. | 524/487 |
| 4,268,552 | 5/1981 | Duvdevani et al. | 428/31 |
| 4,434,598 | 3/1984 | Adell | 52/716 |
| 4,513,044 | 4/1985 | Shigeki et al. | 428/358 X |
| 4,603,899 | 8/1986 | Iwasa | 428/122 X |
| 4,634,735 | 1/1987 | Thiersault et al. | 428/31 X |
| 4,654,257 | 3/1987 | Murachi | 428/31 X |
| 4,654,262 | 3/1987 | Alonso | 428/345 |
| 4,701,376 | 10/1987 | Hermann et al. | 428/31 X |
| 4,708,351 | 11/1987 | Midooka et al. | 428/122 X |
| 4,778,550 | 10/1988 | Barton et al. | 428/31 X |
| 4,780,345 | 10/1988 | Gray | 428/60 X |
| 4,783,931 | 11/1988 | Kirkwood | 428/122 X |
| 4,937,126 | 6/1990 | Jackson | 428/31 X |
| 4,943,466 | 7/1990 | Bareich | 428/122 |
| 4,949,507 | 8/1990 | Vaughan | 49/491 X |
| 4,975,306 | 12/1990 | Jackson | 428/31 |
| 5,018,308 | 5/1991 | Vaughan | 428/122 X |

FOREIGN PATENT DOCUMENTS 1459504 12/1976 United Kingdom ............... 428/122

*Primary Examiner*—Henry F. Epstein
*Attorney, Agent, or Firm*—Harness, Dickey & Pierce

[57] ABSTRACT

A molding for attachment to a vehicle includes a support member and a first colored layer secured to the support member. A second colored layer is abutted to the first colored layer at one edge thereof, and secured to the support member. The first and second colored layers are of similar colors presenting a color matched molding.

19 Claims, 1 Drawing Sheet

COLOR MATCH MOLDING AND WEATHERSTRIP

This is a continuation/division of U.S. patent application Ser. No. 265,511, filed Sep. 19, 1988 now U.S. Pat. No. 4,975,306.

BACKGROUND OF THE INVENTION

The present invention relates to a molding for attachment to a vehicle. More particularly, the present invention relates to a molding and weatherstrip which can be color matched to the surface of a vehicle.

Moldings or weather strips are well known for use with automotive vehicles and are typically made of synthetic elastomeric materials because of the desirable physical properties of such materials. Such moldings are generally black in color, however, because of difficulties encountered when elastomeric material is colored or painted. Colored weatherstrips are, however, known. For example, U.S. Pat. No. 4,513,044, issued Apr. 23, 1985, to Shigeki et al. discloses a trim portion having an outer surface covered by a colored solid rubber layer having a color. All parts of the weather strip are taught to be formed from the same kind of rubber, such as EPDM or NBR. Colored elastomeric material generally does not present a high-gloss appearance. The color does not hold and the elastomeric material has a dull appearance. Thus, heretofore it has not been possible to match the typical high gloss surface color of vehicles with colored elastomeric materials.

SUMMARY OF THE INVENTION

A molding for attachment to a vehicle includes a support member having a first colored layer secured on one portion thereof and a second colored layer secured on another portion thereof. The first and second colored layers can be of similar colors presenting an integral color matched molding.

In addition, a method is provided for making a colored molding for attachment to a vehicle including the steps of forming a metallic support member to a predetermined configuration by rolling; securing a first colored layer to a surface portion of the support member and securing a second colored layer to a different surface portion of the support member. The first and second colored layers are preferably of similar colors and the first colored layer preferably is of a color which color matches the exterior color of the vehicle to which it is to be attached. The subject invention provides a colored molding which matches the surface color of the vehicle and can present a high-gloss finish.

Other advantages of the present invention will be readily appreciated as the same becomes better understood by reference to the following detailed description when considered in connection with the accompanying drawings.

DESCRIPTION OF THE PREFERRED EMBODIMENT

Figure 1:
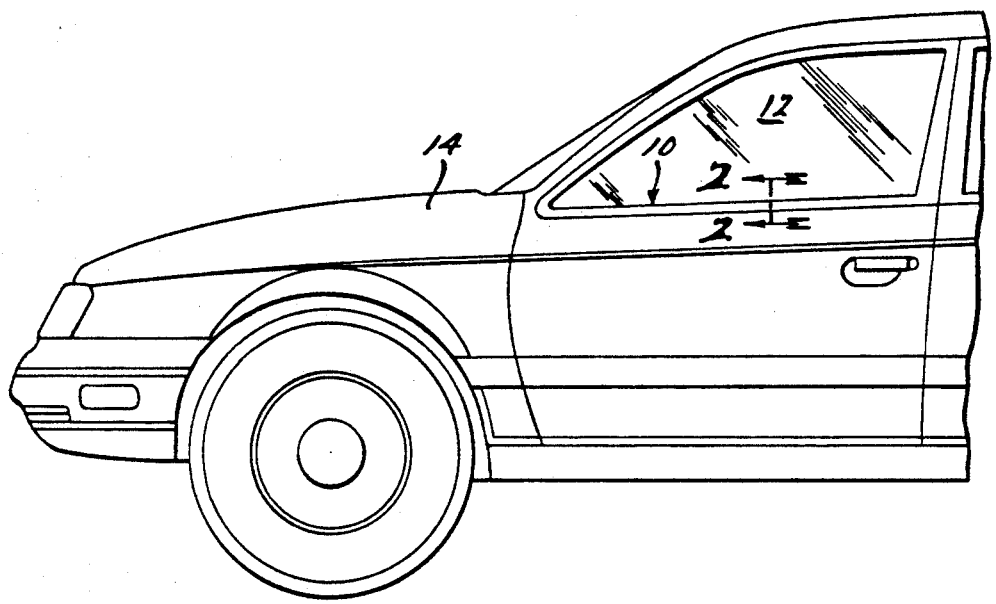
FIG. 1 is an elevational view of a preferred embodiment of the molding of the subject invention attached to a vehicle shown broken away.
Figure 2:
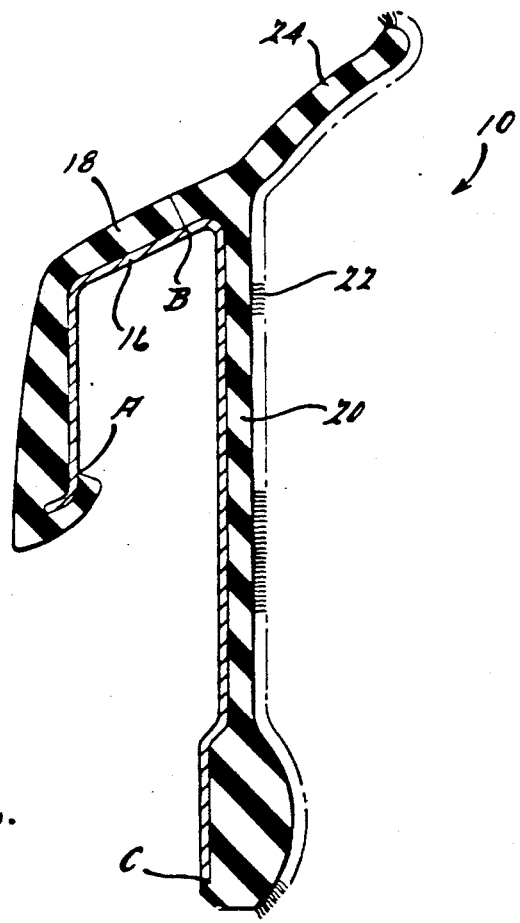
FIG. 2 is a sectional view taken along line 2—2 of FIG. 1.

A preferred embodiment of a weather strip or molding for attachment to a vehicle is generally shown at 10 in FIGS. 1 and 2. The molding 10 is typically a belt weather strip at the bottom of the window 12 of the vehicle 14. The molding 10 includes a metal support member 16 which is generally U-shaped in cross-sectional configuration with one leg longer than the other. A first colored layer 18 is secured to one side of the support member 16. The first colored layer 18 is made of a PVC material having a shore "A" durometer of 86±5. A first adhesive, such as "A1104B", commercially available from B. F. Goodrich, is used to secure the first colored layer 18 to the support member 16. The first adhesive is applied from point A to B on the support member 16.

The molding 10 includes a second colored layer 20 which abuts one end of the first colored layer 18 at B and which is secured to the same side surface of the support member 16 as the first colored layer 18. The second colored layer 20 is made of a thermoplastic elastomer material, i.e., a TPE such as "Santoprene #101-64", commercially available from the Monsanto Chemical Company. A second adhesive, such as "Mor-Ad P80", commercially available from Morton Thiokol, Inc., is applied from point B to C on the support member 16 and secures the second colored layer 20 to the support member 16. TPE comprises rubber and plastic and has the characteristics of a thermoplastic material while also having compression set properties comparable to rubber. Thus TPE is an effective seal. Preferably the TPE is ultraviolet (UV) light stabilized. Also preferably the first and second colored members 18 and 20 have a color similar to each other.

PVC can be made to color match the vehicle body paint, including metallics and high-gloss body paint. Layer 18 which is presented to the outside of the vehicle can thus color match the vehicle body paint. PVC is not a good material for seals because it has poor compression set properties but layer 18 does not have a sealing function. TPE is presently limited to black and lower gloss non-metallic colors. However, layer 20 is presented largely interior of the door. Still, the sealing lip 24 of second colored layer 20 can be made of a color compatible to the vinyl color.

The molding 10 further includes a flock material or low friction coating 22 secured in a conventional manner to a portion of one side of the second colored layer 20.

Accordingly, a method is provided for making a colored molding 10 for attachment to a vehicle 14. The method comprises the steps of forming a support member 16 to a predetermined configuration, such as a U-shape, by roll-forming. The steps include securing a first colored layer 18 to the support member 16 and securing a second colored layer 20 to the support member 16. The steps also include matching the first 18 and second 20 colored layer to have similar colors. The method further includes extruding the first colored layer 18 of a polymeric material such as PVC and extruding the second colored layer 20 of an elastomeric and polymeric material such as Santoprene. The steps further include applying a first and second adhesive selectively along the core member 16 to secure the first 18 and second 20 colored layers to the support member 16, respectively.

The method also includes heating the core member 16 and adhesives to a predetermined temperature and bonding the first 18 and second 20 colored layers to the support member 16 by curing the adhesives. The steps may further include applying a slip coat on a portion of the second colored layer 20 by, for example, priming one side of the second colored layer 20 and applying a third adhesive over the primer and securing a flock material 22 with the third adhesive to the second colored layer 20. The method also includes extruding the first color layer of a high gloss PVC and/or PVC of metallic colors to provide a match to body and trim appearance.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

What is claimed is:

1. A molding for attachment to a vehicle, said molding comprising:
    a support member;
    a first selected colored layer secured to said support member;
    a second selected colored layer secured to said support member; and
    said first selected colored layer having a high gloss appearance matching a corresponding appearance of a portion of the vehicle.

2. A molding as set forth in claim 1 characterized by said first and second colored layers being of similar colors.

3. A molding as set forth in claim 2 further characterized by said first and second colored layer comprising thermoplastic elastomeric materials.

4. A molding as set forth in claim 3 further characterized by said support member comprising a metal material and having a U-shaped configuration.

5. A molding as set forth in claim 4 including an adhesive for securing said first colored layer to one side of said support member.

6. A molding as set forth in claim 5 including an adhesive for securing said second colored layer to said one side of said support member.

7. A molding as set forth in claim 6 including a low friction material on one side of said second colored layer.

8. A molding as set forth in claim 7 wherein said low friction material is a flock material.

9. A colored weather strip for attachment to a vehicle having a portion with a colored surface, said strip comprising:
    a metal support member having a U-shaped configuration;
    a first colored layer secured to one side of said support member and having a high gloss appearance matching a corresponding appearance of the colored surface of a portion of the vehicle;
    a second colored layer abutting one end of said first colored layer and secured to the same side of said support member as said first colored layer;
    a first adhesive for securing said first colored layer to said support member;
    a second adhesive for securing said second colored layer to said support member;
    said first colored layer having a color similar to said second colored layer; and
    low friction material secured to one side of said second colored layer.

10. A method of making a colored molding for attachment to a vehicle having a portion with a colored surface, said method comprising the steps of:
    forming a support member to a predetermined configuration;
    securing a first colored layer having a high gloss appearance to the support member;
    securing a second colored layer to the support member; and
    matching the high gloss appearance of the first colored layer to a corresponding appearance of the colored surface of a portion of the vehicle.

11. A method as set forth in claim 10 including the step of extruding the first colored layer of a polymeric material.

12. A method as set forth in claim 11 including the step of extruding the second colored layer of a thermoplastic elastomeric material.

13. A method as set forth in claim 12 including the step of applying a first and second adhesive selectively along the support member to secure the first and second colored layers to the support member.

14. A method as set forth in claim 13 including the step of heating the support member and adhesives to a predetermined temperature.

15. A method as set forth in claim 14 including the steps of priming one side of the second colored layer, applying a third adhesive over the primer, and securing a flock material to one side of the second colored layer with the third adhesive.

16. A method of making a colored molding for attachment to a vehicle having a portion with a colored surface, said method comprising the steps of:
    forming a support member to a predetermined configuration;
    securing a first colored layer having a high gloss appearance to the support member;
    securing a second colored layer to the support member;
    matching the high gloss appearance of the first colored layer to a corresponding appearance of the colored surface of a portion of the vehicle;
    extruding the first colored layer of a polymeric material;
    extruding the second colored layer of an elastomeric and polymeric material;
    applying a first and second adhesive selectively along the support member to secure the first and second colored layers to the support member, respectively;
    heating the support member and adhesives to a predetermined temperature;
    bonding the first and second colored layers to the support member by curing the adhesives;
    priming one side of the second colored layer;
    applying a third adhesive over the primer; and
    securing a flock material to one side of the second colored layer with the third adhesive.

17. A molding for attachment to a vehicle, said molding comprising:
    a support member;

a first selected colored layer secured to said support member; and said first selected colored layer having a high gloss appearance matching a corresponding appearance of a portion of the vehicle.

18. A method of making a colored molding for attachment to a vehicle having a portion with a colored surface, said method comprising the steps of:

forming a support member to a predetermined configuration;

securing a first colored layer having a high gloss appearance to the support member; and matching the high gloss appearance of the first colored layer to a corresponding appearance of the colored surface.

19. A belt weather strip for attachment to a vehicle, comprising:

a support member;

a first selected colored layer made of a polymeric material secured to said support member;

a second selected colored layer secured to the support member and made of a thermoplastic elastomer material; and said first selected colored layer having an appearance matching a corresponding appearance of an exterior portion of the vehicle.

* * * * *